J. M. Bent,

Cutting Leather.

No. 2,956. Reissued June 2, 1868.

Witnesses:
F. E. Eckemacher
N. W. Stearns

Inventor:
James M. Bent

N. PETERS, PHOTO-LITHOGRAPHER, WASHINGTON, D. C.

United States Patent Office.

JAMES M. BENT, OF WAYLAND, MASSACHUSETTS.

*Letters Patent No.* 58,762, *dated October* 16, 1866; *reissue No.* 2,956, *dated June* 2, 1868.

IMPROVED MACHINE FOR PUNCHING LEATHER.

The Schedule referred to in these Letters Patent and making part of the same.

Be it known that I, JAMES M. BENT, of Wayland, in the State of Massachusetts, have invented certain Improvements in Machines for Punching Leather, of which the following, with the accompanying drawings, is a full and clear description.

Figure 2:
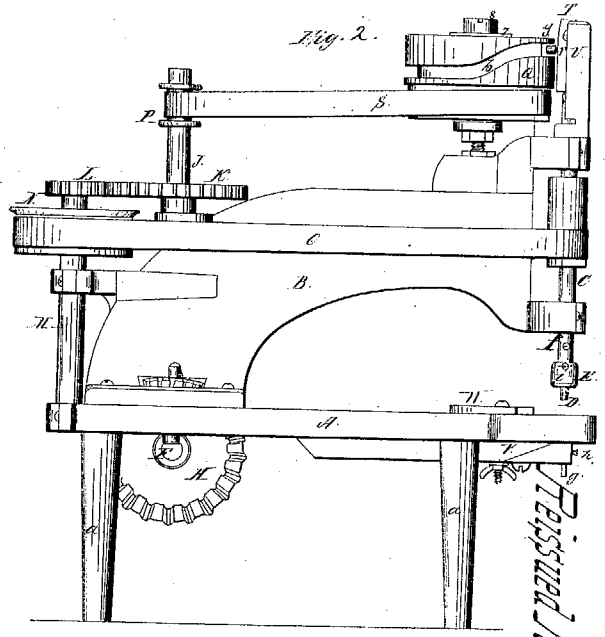
Figure 2 is a side elevation
Figure 1:
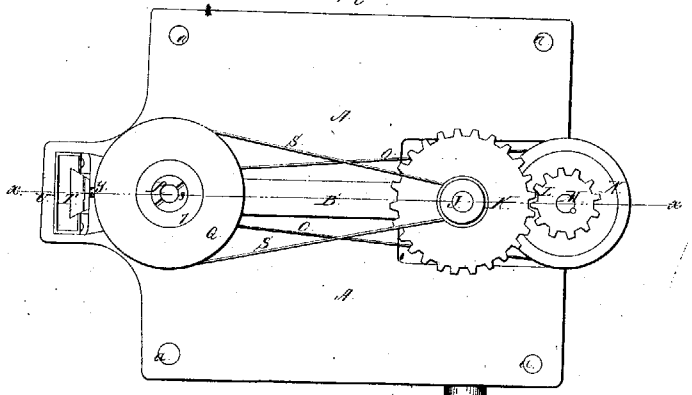
Figure 1 is a plan of my machine.
Figure 3:
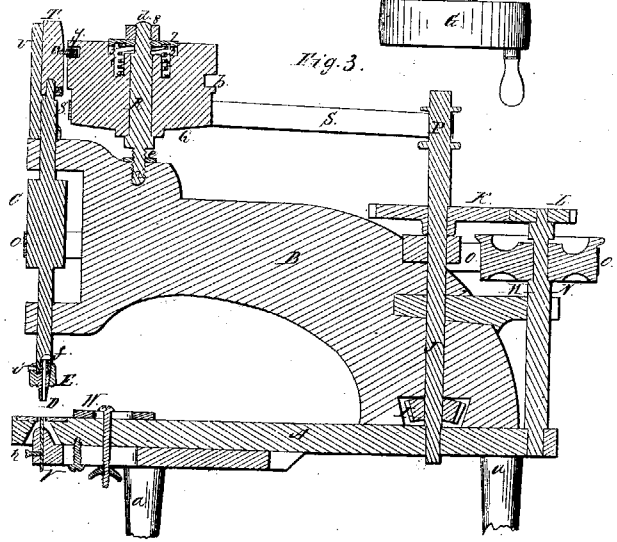
Figure 3 is a vertical section on line *a a* of fig. 1.

My invention consists of a punch, used in connection with dies of various forms and sizes, the punch making a hole, and the die producing around it the imitation or figure of an eyelet, or otherwise. My further invention consists in the use of a pin, which clears the punch, when made hollow. And, further, my invention consists in an improved arrangement, by which the die adapts itself to various thicknesses of leather.

In the drawings, A is a table, supported by legs, *a*. To the upper side of the table is secured one end of a bent standard, B, the other end of which is provided with bearings, in which a vertical spindle, C, (carrying a punch, D, and die, E,) is placed, and is made to revolve in the following manner:

F is the driving-shaft, to one end of which is secured the driving pulley, G, the other end carrying a bevel-wheel, H, which engages with a bevel-pinion, I, at the foot of a vertical shaft, J, provided with a cog-wheel, K, which drives the cog-wheel L, on the upper end of a vertical shaft, M.

N is a circular drum, keyed to the shaft M, and carries an endless belt, O, which passes around an enlarged portion of the vertical spindle C, which is thereby caused to revolve. Near the upper end of the shaft J is formed a spool, P, around which and a drum, Q, upon an upright shaft, R, passes an endless belt, S. The upper portion of the drum Q is provided with a cam-groove, *b*, for the reception of a roller, *y*, on a pin, *c*, which projects from the head of the spindle-stock, T, which is raised or lowered within guides, U, when the drum Q is revolved upon its shaft, R, which is provided with a screw-thread, *d*, upon which turns a nut, *e*, and by which the shaft may be raised or lowered, to adjust the drum Q to the right height for hinging the die down, to make the impression round the punched hole.

In the top of the drum Q is formed a circular cavity, 5, for the reception of a spiral spring, 6, the lower end of which rests on the floor of the cavity, while the other end of the spring bears on the under side of a circular plate, 7, which is raised or lowered so as to release or compress the spring 6, by operating a nut, 8, which turns on a screw-thread cut on the upper end of the shaft R, in order that, when leather of varying thickness is passed through the machine, the drum will at all times exert the required degree of pressure to cause the die E to produce the impression of the eyelet, or otherwise, in permanent form. By revolving the die rapidly, instead of merely stamping it upon the leather, the impression is more smooth and finished, which can be done where the figure is round and smooth.

The punch, D, fits into the lower end of the spindle, C, which is provided with an opening, *f*, through which the portion of leather cut out is delivered, when brought down against a pin, *g*, which is moved up and down, and confined, when adjusted vertically, by a set-screw, *h*, within a sliding piece, V, the office of which is to bring the pin *g* in the centre of the hole *j*, through which the punch descends.

The punch, when being made to revolve, penetrates the leather without the employment of a solid bearing or cutting-table, and cuts the hole cleaner and easier. The die E is of such a form as to make an impression in imitation of an eyelet, and is secured near the lower end of the punch D by a set-screw, *i*, by which means the die may be removed and another substituted.

W is a gauge or guide, against which the edge of the leather is placed, to fix the line of holes. Punches and dies of different sizes may be used, as found desirable, the main object being to use a die, in combination with the punch, for ornamental purposes, or otherwise.

What I claim, and desire to secure, is—

1. The combination of a die with a punch, substantially as and for the purposes described.
2. The punch and die, when made to revolve in combination, substantially as described.
3. The mechanically-revolving punch, substantially as described.

4. In combination with a cutting-punch, a clearing-pin, substantially as described.

5. So constructing the parts as to cause the die to adapt itself to different or varying thicknesses of leather, substantially as described.

6. The combination of a hollow cutting-punch with a perforated punching-table and clearing-pin, substantially as described.

In witness whereof, I have hereto signed the foregoing specification.

JAMES M. BENT.

Witnesses:

A. B. ELY,

W. M. PARKER.